United States Patent
Kompella

(10) Patent No.: US 9,246,801 B1
(45) Date of Patent: Jan. 26, 2016

(54) TRANSMITTING PACKET LABEL CONTEXTS WITHIN COMPUTER NETWORKS

(75) Inventor: Kireeti Kompella, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 814 days.

(21) Appl. No.: 12/419,507

(22) Filed: Apr. 7, 2009

Related U.S. Application Data

(60) Provisional application No. 61/122,138, filed on Dec. 12, 2008.

(51) Int. Cl.
| | | |
|---|---|---|
| H04L 12/28 | (2006.01) | |
| H04L 12/723 | (2013.01) | |
| H04L 12/721 | (2013.01) | |
| H04Q 11/00 | (2006.01) | |
| H04L 12/46 | (2006.01) | |

(52) U.S. Cl.
CPC .............. *H04L 45/50* (2013.01); *H04L 12/4645* (2013.01); *H04L 45/507* (2013.01); *H04L 45/68* (2013.01); *H04Q 2011/0077* (2013.01)

(58) Field of Classification Search
CPC ....... H04L 45/50; H04L 45/507; H04L 45/68; H04Q 2011/0077
USPC ......... 370/395.52, 386, 230, 395.5, 390, 389, 370/248, 400, 392, 252; 709/202
See application file for complete search history.

(56) References Cited

U.S. PATENT DOCUMENTS

| | | | |
|---|---|---|---|
| 5,570,084 A | 10/1996 | Ritter et al. | |
| 7,099,286 B1 | 8/2006 | Swallow | |
| 7,522,603 B2 | 4/2009 | Vasseur | |
| 7,602,778 B2 * | 10/2009 | Guichard et al. | 370/389 |
| 7,710,872 B2 | 5/2010 | Vasseur | |
| 7,808,919 B2 * | 10/2010 | Nadeau et al. | 370/248 |
| 8,094,575 B1 | 1/2012 | Vadlakonda et al. | |

(Continued)

FOREIGN PATENT DOCUMENTS

CN 102014040 A 4/2011

OTHER PUBLICATIONS

IETF RFC 3031 Multiprotocol Label Switching Architecture Jan. 2001.*

(Continued)

*Primary Examiner* — Brian O'Connor
*Assistant Examiner* — Lionel Preval
(74) *Attorney, Agent, or Firm* — Shumaker & Sieffert, P.A.

(57) ABSTRACT

In general, techniques are described for transmitting context information defining contexts for packet labels in a network. More specifically, a network device, e.g., a router, implements the context transmission techniques to facilitate debugging or troubleshooting of the network. The network device may comprise an interface card that receives a Multi-Protocol Label Switching (MPLS) data unit from another network device in accordance with a label switching protocol. The data unit may include a label stack affixed to a payload. The label stack may include one or more MPLS labels and context information associated with at least one of these labels, The interface card may, when forwarding the data unit, parse the data unit to determine the context information and then forward the data unit in accordance with these MPLS labels. A control unit included within the network device may record the forwarding of the data unit and the determined context information.

28 Claims, 5 Drawing Sheets

(56) References Cited

U.S. PATENT DOCUMENTS

| | | | |
|---|---|---|---|
| 2002/0133756 A1 | 9/2002 | Jain | |
| 2003/0137978 A1* | 7/2003 | Kanetake | 370/386 |
| 2004/0042406 A1 | 3/2004 | Wu et al. | |
| 2004/0223497 A1* | 11/2004 | Sanderson et al. | 370/395.52 |
| 2005/0125490 A1* | 6/2005 | Ramia | 709/202 |
| 2005/0220014 A1* | 10/2005 | DelRegno et al. | 370/230 |
| 2006/0171323 A1* | 8/2006 | Qian et al. | 370/252 |
| 2008/0025309 A1 | 1/2008 | Swallow | |
| 2008/0056264 A1 | 3/2008 | Ong | |
| 2008/0151768 A1 | 6/2008 | Liu | |
| 2008/0151783 A1 | 6/2008 | Bamba | |
| 2009/0003350 A1* | 1/2009 | Guichard et al. | 370/392 |
| 2009/0175274 A1* | 7/2009 | Aggarwal et al. | 370/390 |
| 2010/0091778 A1* | 4/2010 | D'Souza et al. | 370/400 |
| 2010/0124225 A1* | 5/2010 | Fedyk | 370/390 |
| 2010/0208741 A1 | 8/2010 | Vasseur | |

OTHER PUBLICATIONS

IETF RFC 3270 Multi-Protocol Label Switching (MPLS) Support of Differentiated Services May 2002.*

IETF RFC 3036 "LDP Specification", Jan. 2001.*

Rosen et al.; MPLS Label Stack Encoding; IETF Request for Comments: 3032; Jan. 2001.*

Katz et al. "Traffic Engineering (TE) Extensions to OSPF Version 2" Network Working Group, RFC 3630, Sep. 2003, 14 pgs.

Aggarwal et al. "MPLS Upstream Label Assignment and Context-Specific Label Space", IETF RFC 5331, Network Working Group, Aug. 2008, 14 pp.

Berger et al., "The OSPF Opaque LSA Option," RFC 5250, Network Working Group, The IETF Trust, Jul. 2008, 17 pp.

Kompella et al., "OSPF Extensions in Support of Generalized Multi-Protocol Label Switching (GMPLS)," RFC 4203, Network Working Group, The Internet Society, Oct. 2005, 11 pp.

Kompella et al., "IS-IS Extensions in Support of Generalized Multi-Protocol Label Switching (GMPLS)," RFC 5307, Network Working Group, The IETF Trust, Oct. 2008, 12 pp.

Thomas et al., "LDP Applicability," RFC 3037, Network Working Group, The Internet Society, Jan. 2001, 7 pp.

Li et al., "IS-IS Extensions for Traffic Engineering," RFC 5305, Network Working Group, The IETF Trust, Oct. 2008, 17 pp.

* cited by examiner

TRANSMITTING PACKET LABEL CONTEXTS WITHIN COMPUTER NETWORKS

This application claims the benefit of U.S. Provisional Application No. 61/122,138, filed Dec. 12, 2008, the entire content of which is incorporated herein by reference.

TECHNICAL FIELD

The invention relates to computer networks and, more particularly, to routing packets within computing networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Packet-based computer network increasingly utilize label switching protocols for traffic engineering and other purposes. In a label switching network, network devices, often referred to as Label Switching Routers or LSRs, use Multi-Protocol Label Switching (MPLS) signaling protocols to establish Label Switched Paths (LSPs). The LSRs utilize these MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR.

Typically, LSRs at the edge of the MPLS network, referred to as Label Edge Routers (LERs), establish paths through the MPLS network in accordance with the MPLS signaling protocol. LERs may forward signaling messages throughout the network to distribute the appropriate labels in accordance with the MPLS signaling protocol. The LSRs, which typically reside at the core of the MPLS network, along a given path may then update their respective forwarding tables with the appropriate labels. Often LSRs update the forwarding tables to indicate whether to append, swap or remove one of the labels corresponding to a given path.

Upon receiving a unit of data, such as an IP packet, entering the MPLS network, LERs may then inspect the data unit, pre-pend one or more MPLS label to the data unit based on the result of the inspection, and forward the data unit via the LSP associated with the label. Upon receiving the labeled data unit, a downstream LSRs may append an additional label, swap labels or remove the label based on the LSR's forwarding table. The LSR however need not inspect the MPLS packet but may instead base forwarding strictly on the one or more MPLS labels included within a label stack pre-pended to the packet. In this respect, the LSR may perform protocol-independent forwarding and may be used to encapsulate other types of data units, such as ATM cells or IP packets. As a result, the LSRs may, by forgoing detailed packet inspection, more efficiently and quickly forward data units throughout the MPLS network.

SUMMARY

In general, the techniques are described for transmitting label contexts within a computer network, such as a Multi-Protocol Label Switching (MPLS) network. A label context represents additional information (or "context information") that identifies a context associated with a corresponding label. Label switching routers (LSRs) utilize label distribution protocols to distribute MPLS labels and establish LSPs. When negotiating an LSP, the participating LSRs also utilize the label distribution protocols to negotiate the additional use and structure of context information to be associated with any labels allocated for use along the LSP.

After establishing the LSP, a label stack of one or more labels as well as additional context labels defining the additional context information is affixed to a given data unit being forwarded along an LSP. The additional context information carried by the label stack may specify, for example, a source network address assigned to an ingress Label Edge Router (LER) that established the path associated with the label affixed to a data unit, a destination network address assigned to an egress LER that terminates the path, a customer identifier identifying a customer network from which the data unit was transmitted, or any other information that may provide context for a corresponding label. LSRs along the path may parse and record this information when forwarding the data units along the path and may present this information to a software tool or network administrator or other user to, for example, aid debugging, traffic filtering, traffic engineering or other actions. For example, this additional context information included within the label stack of the MPLS packets may enable these users or tools to more efficiently debug MPLS or other label switching networks.

In operation, a network device of a label switching network (e.g., an intermediate LSR along an LSP) may receive a data unit being forwarded along the path, e.g., an IP packet, Ethernet frame, ATM cell or the like encapsulated within an MPLS packet, via a network link from another network device. The MPLS packet may comprise a label stack having one or more labels and additional context information associated with at least one of the one or more labels. The network device typically maintains an internal MPLS label space from which one or more of the labels were allocated when the LSP was established using the label distribution protocol. The network device maintains data defining associations between the MPLS labels and the context information. For example, the network device may maintain the data as a forwarding table within a forwarding plane commonly used to bind labels with a next hop along the LSP. Particularly, the network device may maintain associations between the labels and a scope of context information associated with each of the labels. The scope may define a data type for the context information, a location within the label stack and a length or amount of the context information associated with each of the labels.

When forwarding MPLS packets, the network device typically access one or more of the labels of each of the packets, which may comprise a top-most or outer label of the label stack of the MPLS packets, and either forwards the MPLS packet along the LSP by performing a label swap or extracting the encapsulated data unit by popping one or more of the labels. Furthermore, the network device may be programmatically configured such that, when forwarding MPLS packets, the network device retrieves the association between the label(s) involved in the forwarding process and the scope of the context information from the forwarding table. Based on this scope, the network device may parse the data unit to determine the structure of the data within the label stack that defines the context information for the labels. For example, the network device may determine the set amount of bits defined by the scope as well as the location within the label stack. This determined context information may represent values for the corresponding type also defined within the scope. A control unit included within the network device may then record the context information in accordance with the type for subsequent reporting, e.g., by presenting a properly formatted IP address, as well as, possibly the type of the context information, e.g., by presenting alongside the IP address a text field stating "IP address," to a user via a user interface.

The context information for the forwarded MPLS packets may provide numerous uses. For example, a user may view the context information, which may have been previously configured by the user, to improve or facilitate debugging of the network. That is, the user may configure the network devices to include context information of various types and associate the context information to particular paths, network devices or other network elements. The user may then log or retrieve this context information in the manner described above to better understand the network traffic that travels particular paths, the network devices along a path or within the network, or other network operations or elements. For example, the user may enable data units to transmit both an ingress network address assigned to an ingress network device for a particular path and an egress network address assigned to an egress network device for the same path. This information may enable the individual data units traveling along a path to specify the end-to-end LSP each data unit is traversing, thereby self-identifying the paths. A user may, as described above, view this information to better understand the operation of and therefore debug paths established through the network.

In one embodiment, a method comprises receiving, with a first network device along a label-switched path (LSP) through a network, a Multi-Protocol Label Switching (MPLS) data unit from a second network device of the network in accordance with a label switching protocol, wherein the data unit includes a label stack affixed to a payload, and wherein the label stack includes one or more MPLS labels and context information associated with at least one of the labels of the label stack and forwarding the data unit out an output interface of the first network device in accordance with the one or more MPLS labels of the label stack. The method further comprises, when forwarding the data unit, parsing, with the first network device, the data unit to determine the context information and recording the forwarding of the data unit and the determined context information.

In another embodiment, a network device along a label-switched path (LSP) through a network comprises an interface card that receives a Multi-Protocol Label Switching (MPLS) data unit from a second network device of the network in accordance with a label switching protocol, wherein the data unit includes a label stack affixed to a payload, and wherein the label stack includes one or more MPLS labels and context information associated with at least one of the labels of the label stack, forwards the data unit in accordance with the one or more MPLS labels of the label stack and, when forwarding the data unit, parses the data unit to determine the context information. The network device further comprises a control unit that records the forwarding of the data unit and the determined context information.

In another embodiment, a network system comprises one or more customer networks and a network. The network comprises at least two network devices that each reside at an edge of a network, wherein one of the at least two edge network devices couples to the one or more customer networks and a transit network device positioned between the at least two edge network devices. The transit network device includes an interface card that receives a data unit from one of the edge network devices of the network in accordance with a label switching protocol, wherein the data unit includes one or more labels and context information associated with at least one of the labels defining a context for the at least one of the labels, and parses the data unit to determine the context information and a control unit that presents the determined context information to a user.

In another embodiment, a network system comprises an ingress Label Switching Router (LSR) of a Multi-Protocol Label Switching (MPLS) network, an egress LSR of the MPLS network, and at least one intermediate LSR positioned between the ingress LSR and egress LSR of the MPLS network. The ingress LSR, the egress LSR and the at least one intermediate LSR all lie along a Label Switched Path (LSP) through the MPLS network. The ingress LSR, the egress LSR and the at least one intermediate LSR exchange one or more signaling messages in accordance with a label distribution protocol (LDP) to negotiate establishment of the LSP. The one or more signaling messages each specifies context information to be included within the network stack for at least one of the one or more labels when forwarding MPLS packets along the LSP.

In another embodiment, a computer-readable medium comprises instructions for causing a programmable processor to receive, with a first network device along a label-switched path (LSP) through a network, a Multi-Protocol Label Switching (MPLS) data unit from a second network device of the network in accordance with a label switching protocol, wherein the data unit includes a label stack affixed to a payload, and wherein the label stack includes one or more MPLS labels and context information associated with at least one of the labels of the label stack, forward the data unit out an output interface of the first network device in accordance with the one or more MPLS labels of the label stack, when forwarding the data unit, parse, with the first network device, the data unit to determine the context information and record the forwarding of the data unit and the determined context information.

In another embodiment, a method comprises receiving, with a first ingress network device along a label-switched path (LSP) through a first network, a data unit from a second network device of a second network, wherein the data unit includes a header and a payload, but does not include a label stack, inspecting, with the first ingress network device, the header and payload of the data unit to determine a forwarding equivalence class (FEC), and determining, with the first ingress network device, a label entry within a forwarding table based on the determined FEC, wherein the label entry defines a MultiProtocol Label Switching (MPLS) label and a scope of context information associated with the MPLS label to affix to the data unit. The method also comprises determining, with the first ingress network device, context information in accordance with the scope of the context information defined by the label entry, affixing, with the first ingress network device, a label stack to the data unit in accordance with an MPLS protocol to generate an MPLS packet, wherein the label stack includes the MPLS label defined by the label entry and the determined context information, and forwarding, with the first ingress network device, the MPLS packet out an output interface of the first ingress network device in accordance with the MPLS label of the label stack.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
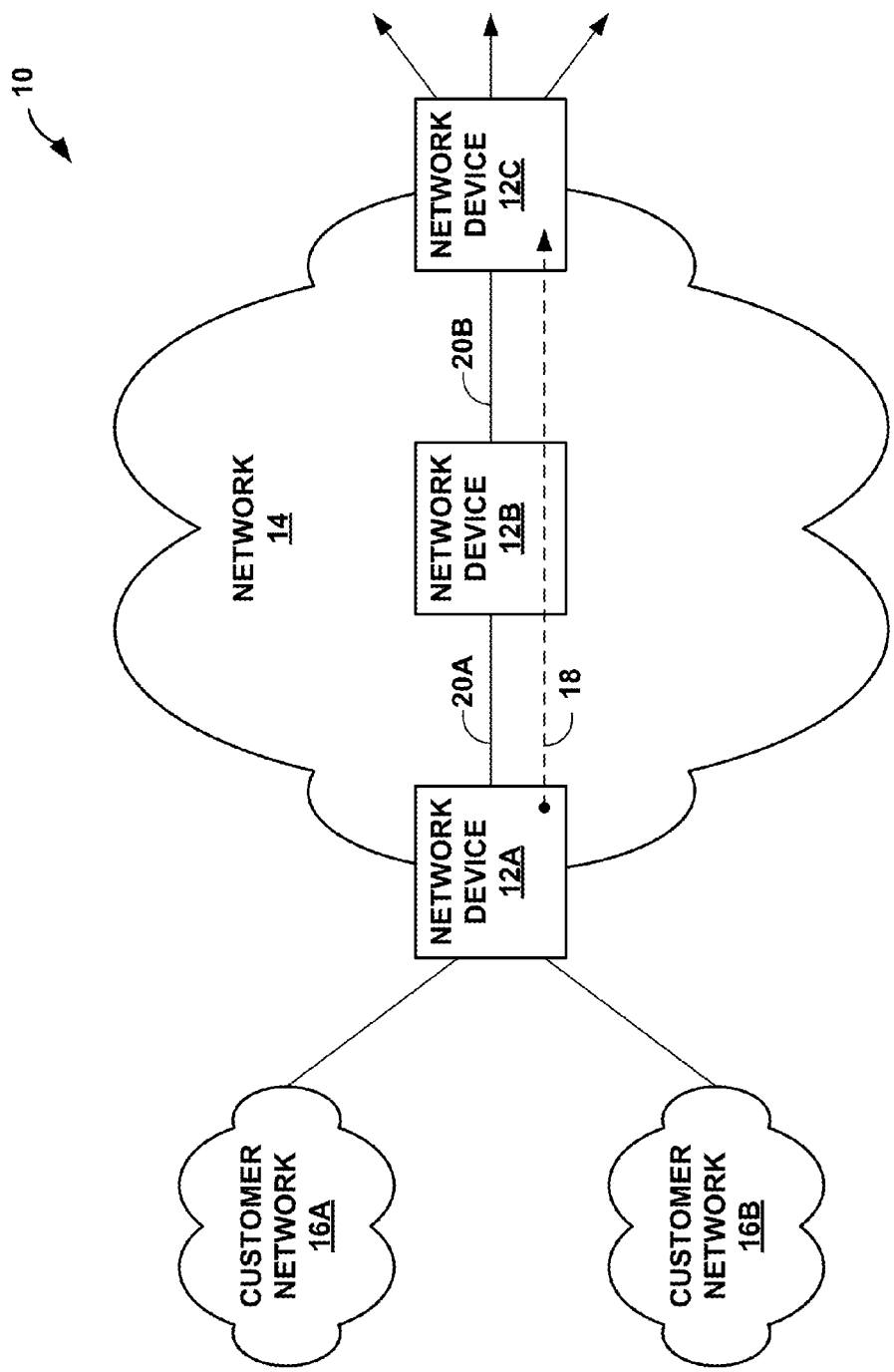
FIG. 1 is a block diagram illustrating a network system in which one or more of network devices performs the label context transmission techniques described in this disclosure.

FIG. 1 is a block diagram illustrating a network system 10 in which one or more of network devices 12A-12C performs the label context transmission techniques described in this disclosure. Network devices 12A-12C ("network devices 12") may each represent a network device, such as a router, that forwards or "switches" data units, such as packets or cells, via a set path or route through a network, such as network 14, according to labels associated with each data unit. Accordingly, each of network devices 12 may represent and be referred to herein as a "Label Switching Router" or LSR. While described with respect to this particular type of network device 12, any MPLS-enabled network device capable of routing and forwarding data units according to MPLS labels may implement the label context transmission techniques to facilitate debugging, troubleshooting or other actions within a network system, such as network system 10.

As shown in FIG. 1, network system 10 includes a network 14 and first and second customer networks 16A, 16B ("customer networks 16"). Network 14 may represent a public network that is owned and operated by a service provider to interconnect a plurality of edge networks, such as customer network 16. As a result, network 14 may be referred to herein as a Service Provider (SP) network or, alternatively, as a "core network" considering that network 14 interconnects edge networks, such as customer networks 16. Exemplary service providers include Verizon Communications Inc. or American Telephone & Telegraph (AT&T) Company. These service providers may lease portions of network 14 or provide services offering interconnection through network 14 to customer network 16, which may lease the portions or purchase the services provided by network 14.

Customer networks 16 may each represent a network owned and operated by a large entity, such as a university, corporation, business, or other facility or enterprise. Each of customer networks 16 may operate according to a wide variety of network protocols, such as any of the 802.3X family of network protocols related to the Ethernet protocol, any of the 802.1X family of wireless networking protocols, an Internet Protocol (IP) protocol, an Asynchronous Transfer Mode (ATM) protocol, and a Transmission Control Protocol (TCP). Moreover, one or more of customer networks 16 may comprise a Virtual Private Network (VPN), a Large Area Network (LAN), or a Wide Area Network (WAN). Although not shown in FIG. 1 for ease of illustration, each of customer networks 16 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Network 14 may interconnect the plurality of customer networks according to any number of protocols. Commonly, however, a transit network, such as network 14, that interconnects various customer networks 16 to one another implements a mechanism or protocol for quickly switching data units, which may comprise packets, cells or any other discrete unit of data. Often, these transit networks that implement these mechanisms are referred to as a "data-switched network" or "packet-switched network." Multi-Protocol Label Switching (MPLS) refers to one exemplary mechanism that network 14 may implement to switch data units via one or more paths through network 14. For purposes of illustration, it is assumed herein that network 14 implements the MPLS data-carrying mechanism and, network 14 may therefore be referred to herein as an "MPLS network." While described below with respect to MPLS, the label context distribution techniques may be utilized by any network device that employs labels to forward data units through a network.

The MPLS data-carrying mechanism of network 10 may be viewed as lying between layer 2 and layer 3 of the Open Systems Interconnection (OSI) model and is often referred to as a layer 2.5 protocol. Network 14 may implement one or more MPLS protocol to negotiate and establish LSPs for encapsulating and forwarding many different types of data units through the network, including IP packets, ATM cells, Ethernet frames and Synchronous Optical NETworking (SONET) frames, hence the name multi-protocol label switching. MPLS may be considered a "protocol" in the sense that it comprises other protocols that network 14 may implement to establish the one or more paths through the network, such as a Label Distribution Protocol (LDP), and manage the path, such as a Resource Reservation Protocol (RSVP) or extensions thereof (e.g., a so-called RSVP Traffic Engineering or RSVP-TE protocol). Further information regarding MPLS and the various features of MPLS, as well as, general architectural information regarding MPLS can be found in Request for Comments (RFC) 3031, titled "Mutiprotocol Label Switching Architecture," prepared by the Network Working Group of the Internet Engineering Task Force (IETF), dated January 2001, herein incorporated by reference.

Network 14 may, for example, implement LDP to establish at least one path 18 through network 14. More particularly, network 14 may include the above described plurality of network devices 12 which may, as described above, represent LSRs. Network devices 12A and 12C may each reside at an edge of network 14, and as a result may each be referred to herein as a "Label Edge Router" or LER. Typically, LERs, such as network devices 12A, 12C, establish the one or more paths through network 14 in accordance with a network protocol, such as LDP. Further information regarding LDP, the various services and features of LDP, as well as, general information regarding labels and the applicability of LDP to MPLS can be found in Request for Comments (RFC) 3037, titled "LDP Applicability," prepared by the Network Working Group of the Internet Engineering Task Force (IETF), dated January 2001, herein incorporated by reference.

In the example of FIG. 1, network device 12A establishes a label switched path 18 through network 14 that flows from network devices 12A to network devices 12B via link 20A and from network devices 12B to network devices 12C via link 20B. A path, such as path 18, typically represents a unidirectional flow of network traffic that is established according to one of the MPLS signaling protocols (e.g., LDP). Thus, when network device 12A establishes path 18 in accordance with LDP, path 18 may only transmit or carry network traffic from network device 12A to network device 12C but may not transmit or carry network traffic from network device 12C to network device 12A. Considering this unidirectional flow of network traffic along a given path, for each path, one network device may be referred to as an "ingress network device" while another network device may be referred to as an "egress network device." With respect to path 18, network device 12A may represent the ingress network device and network devices 12C may represent the egress network device. Network device 12B, as it neither acts as an ingress point for traffic entering path 18 nor an egress point for traffic leaving path 18, may be referred to as a "transit network device."

Network device 12A may establish path 18 by first discovering other of network devices 12 that implement LDP. These other network devices 12 may be referred to as "LDP peers." Upon discovering each LDP peer, network device 12A may initiate an LDP session with the discovered one of network devices 12. Network device 12A may then, via the LDP session, negotiate parameters for the LDP session, such as a method by which to exchange labels. After negotiating the parameters, network device 12A and the other one of network devices 12 exchange one or more labels in accordance with the negotiated parameters.

Network device 12A may, for example, establish an LDP session with network device 12B to exchange labels. Network device 12A may, via the established LDP session, advertise bindings between a Forwarding Equivalence Class (FEC) and a label. A FEC refers to a set of data units that a given network device forwards to the same next hop out of the same interface with the same treatment, e.g., quality or class of service. A label may uniquely identify a FEC and each of network devices 12 may maintain a plurality of FECs. Network device 12A may also receive bindings between FECs and labels from network device 12B. Network device 12A may resolve the bindings received from network devices 12B with those already maintained by network device 12A to resolve paths through network 14. Network devices 12 may each perform this exchange until each of network devices 12 maintains a representation of a topology of network 14.

Based on this topology, network devices 12 may resolve the topology to determine the one or more paths through network 14 by which to forward packets associated with each FEC. In some instances, these bindings may be referred to below as a binding or association between a label and a next hop, as the FEC may be used to determine the next hop along a given path. Based on these binding, each path through network 14 may be associated with one or more and, often a plurality of labels, identifying each subsequent next hop along the path. Network device 12A may also reserve bandwidth or other resources via the managing aspect or protocol of MPLS, e.g., RSVP. In this manner, network devices 12A may ensure a particular quality, level or class of service for a given path. For example, network device 12A may reserve 10 mega-bits per second (Mbps) of bandwidth for path 18 in accordance with RSVP.

After establishing path 18 in accordance with MPLS, network device 12A may receive a data unit from one of customer networks 16. Upon receiving the packet, network device 12A may determine to which FEC the packet belongs by inspecting the data unit and, based on the FEC, append a corresponding label to the data unit. The label may be appended to the data unit as an MPLS header that includes or defines a label stack. Much like a software stack data structure, network device 12A may push the corresponding label onto the label stack. Network device 12A may then route the data unit along a given path through network 14 according to the label.

Assuming network device 12A forwards the data unit via path 18, network device 12B receives the data unit with the appended label. Network device 12B may then swap the label with another label that network device 12B associates with the path 18, where the swap may comprise removing or popping the original label appended by network device 12A and pushing or appending a new label. Network device 12B may swap labels because labels may not be unique to a given path. In other words, each of network devices 12 may maintain a separate label space, which in some instances may overlap. Network device 12A may, for example, append a label for a first path and network device 12B may append the same label for a second path different from the first. Thus, each of network devices 12 may maintain conflicting label spaces. To resolve this issue, each of network devices 12 may swap labels to correctly identify each next hop along a path through network 14.

After receiving the data unit, network device 12B may forward the data unit via link 20B to network device 12C along path 18. Network device 12C may inspect the label, and determine that the label identifies path 18, which requires network device 12C to remove the data unit from path 18 and forward it to its destination. Network device 12 may remove or pop the label from the label stack of the MPLS header, and forward the data unit to the destination indicated in to original data unit header, such as an IP header, instead of forwarding the data unit based on the MPLS header. Network device 12C may then forward the data unit to the destination via any one of a number of routes, as indicated in FIG. 1 by the plurality of arrows exiting network device 12C. In this manner, network 14 may implement the MPLS protocol to establish paths and switch data units along the paths according to the labels associated with the paths. In this respect, paths, such as path 18, may be referred to as a Label Switched Path (LSP).

Network 14 may implement MPLS for a number of reasons. First, MPLS moves path selection and route decisions to the edges of the network, thereby improving forwarding performance in the core of the network. To illustrate, in the above example, only network device 12A, 12C (or LERs) inspect the data unit to determine to which FEC the data unit belongs and the destination indicated by the original data unit, respectively. Transit network devices 12B, however, forwards the data unit based on the appended label and may forgo further packet inspection. While LERs, such as network devices 12A, 12C, may establish and terminate paths and therefore act as ingress and egress network devices that perform this inspection prior to admitting data units to and removing data units from paths, transit network devices, such as network device 12B, may forgo the inspection and instead forward data units based on the labels regardless of the protocol to which each packet corresponds. As a result, transit network devices, such as network device 12B, may more efficiently forward data units, as network device 12B may forward data units based on labels without having to perform additional inspection of data units.

Second, as a result of the efficient forwarding described above, transit MPLS network devices, such as network device 12B, may be more cost efficient. That is, network device 12B may not require additional hardware and/or software to perform the packet inspection and therefore may not require the additional cost associated with implementing this logic. Third, MPLS networks, such as network 14 may transmit any type of data unit or network traffic that corresponds to a number of different protocols, including IP, an Ethernet protocol, and an ATM protocol. In this respect, MPLS may not require any protocol-specific hardware architecture in the core of the network and may be considered protocol independent. Thus, service providers may employ MPLS network 14 to service a wide variety of customers that implement a wide variety of network architectures to form customer networks, such as customer networks 16.

In accordance with the label context transmission techniques described in this disclosure, one or more of network devices 12 may append, in addition to a label, a label context that defines context information for the corresponding label. The label context information may identify, for example, one or more of a source address, a destination address, a source port, a destination port, an ingress address (e.g., an address assigned to an ingress network device, such as network device 12A), an egress network device (e.g., an address assigned to an egress network device, such as network device 12C), a virtual path identifier (as defined by the ATM protocol, for example), a virtual channel identifier (again, as defined by the ATM protocol, for example), a protocol type identifying the protocol to which the data unit corresponds, a customer identifier (e.g., a customer identifier assigned by the service provider to customer networks, such as customer networks 16), a Media Access Control (MAC) address, or any other information that defines a context by which the label may be understood or that may be useful in debugging or otherwise troubleshooting network 14.

In some instances, an ingress network device on an LSP appends context information that identifies the ingress address and the egress address for the path to which the label corresponds. For example, network device 12A may determine that a given data unit belongs to a FEC associated with a first label. The first label may identify, for purposes of example, path 18. Network device 12A may then append the first label followed by context information that includes an address assigned to ingress network device 12A for path 18 and the address assigned to egress network device 12C for path 18. Network device 12A may determine this information when inspecting the packet to determine the FEC to which the packet belongs. In these instances where the context information identifies both the ingress and egress devices of a given path, the label associated with this context information may be referred to as a "self-identifying" label in that the label and associated context information identify the path by itself in the data plane without reference to other information normally maintained in the control plane of network devices.

Regardless of type of context information, network device 12A may push the determined label and the corresponding context information into the label stack of the data unit and forward the data unit with this MPLS header to network device 12B. Network device 12B of network 14 may receive the data unit from network device 12A of network 14 via a path 18 established in accordance with LDP, as described above. The received data unit may include one or more labels and context information associated with at least one of the labels that defines the context for the at least one of the labels.

Network device 12B may typically swap the top label of the stack with a new label maintained by network device 12B, thereby associating the context information associated with the previous label with the new label. In this respect, network device 12B may implement ordinary swapping as provided for by the MPLS protocol. Network devices 12B may then forward the data unit according to the new label to network device 12C via path 18. Network device 12C may pop both the new label and any context information associated with the new label from the label stack before forwarding the original data unit (e.g., the data unit as received by ingress network device 12A) to a destination indicated by the data unit.

To perform both the push and the pop operations, an administrator may statically configure each of network devices 12 to append, swap, or remove a given or set amount of context information following one or more labels in the label stack. Otherwise, network devices 12, when swapping labels according to LDP, for example, may negotiate the set amount of context to append (push) or remove (pop) for one or more labels in the label stack when negotiating and establishing the LSP. That is, network device 12 may utilize the label distribution signaling messages (e.g., LDP or RSVP messages) to negotiate and exchange context information for the LSP being created and to be included within the label stack as MPLS packets are forwarded along the LSP.

Regardless of how network devices 12 determine the amount of context information associated with each label, network devices 12 may determine, for each label, whether the label corresponds to context information. If so, ingress network devices, such as network device 12A, may determine and append the given amount of context information and egress network devices, such as network device 12C, may remove the set amount of context information associated with the label. If no context information is associated with a given label, network device 12A may append the label, network device 12B may swap the label, and network device 12C may remove the label. In this manner, each of network devices 12 may transmit label context information in accordance with the label context transmission techniques described herein.

Label context information may be useful in a number of instances. In particular, transit network devices, such as network devices 12B, security devices, traffic monitoring tools or other devices that lie internal or at the core of network 14 may not have access to destination or other information required to determine the source and destination of a given path on which a particular data unit travels (as path determination and routing occur at the edges or LERs of network 14). The context information may therefore be useful in identifying a path over which an associated data unit travels, especially if the context information enables self-identifying labels. Other context information, such as protocol type and customer identifier or customer ID, may be useful again in identifying which paths are established for which customer. As path negotiations may be automatic after initial configuration by an administrator, such context information may be pertinent to debugging or otherwise troubleshooting paths through an MPLS network to resolve a customer issue with a network service, such as Virtual Private Large Area Network (LAN) Service (VPLS), offered by the service provider.

In this respect, network device 12B may parse or otherwise extract context information from the label stack of the MPLS header appended to a given data unit. Network device 12B may record, output as a data stream or otherwise further present this information, e.g., via a user interface, to the administrator or other user such that the administrator or other user may view and/or interact with the parsed context information. The administrator or other user may utilize this context information to debug or troubleshoot network 14, filter transit MPLS traffic at any point within network 14 traffic (e.g., by way of an MPLS-enabled security device), product reports to aid traffic engineering or other operations.

By virtue of including this label information within transit MPLS packets flowing through the data plane of each MPLS-enabled network transit device, such as network device 12B, the data plane devices may parse the data unit to extract and record relevant context information, even within the core of the network. As many more paths may flow through the transit network devices (as throughput may be increased due to the efficiency with which these devices may forward packets), these transit network device may be able to monitor, by parsing the extracted context information, many more paths than either of the ingress or egress network devices. As a result, network device 12B may provide a more centralized location by which to monitor paths, such as path 18, thereby further improving debugging or troubleshooting by an administrator or other user by presenting a larger view of the network. In this sense, the label context transmission techniques may funnel context information to a central location using the data units themselves to transport the context information within the label stack, thereby leveraging the MPLS protocol to provide more transparent access to paths.

Figure 2:
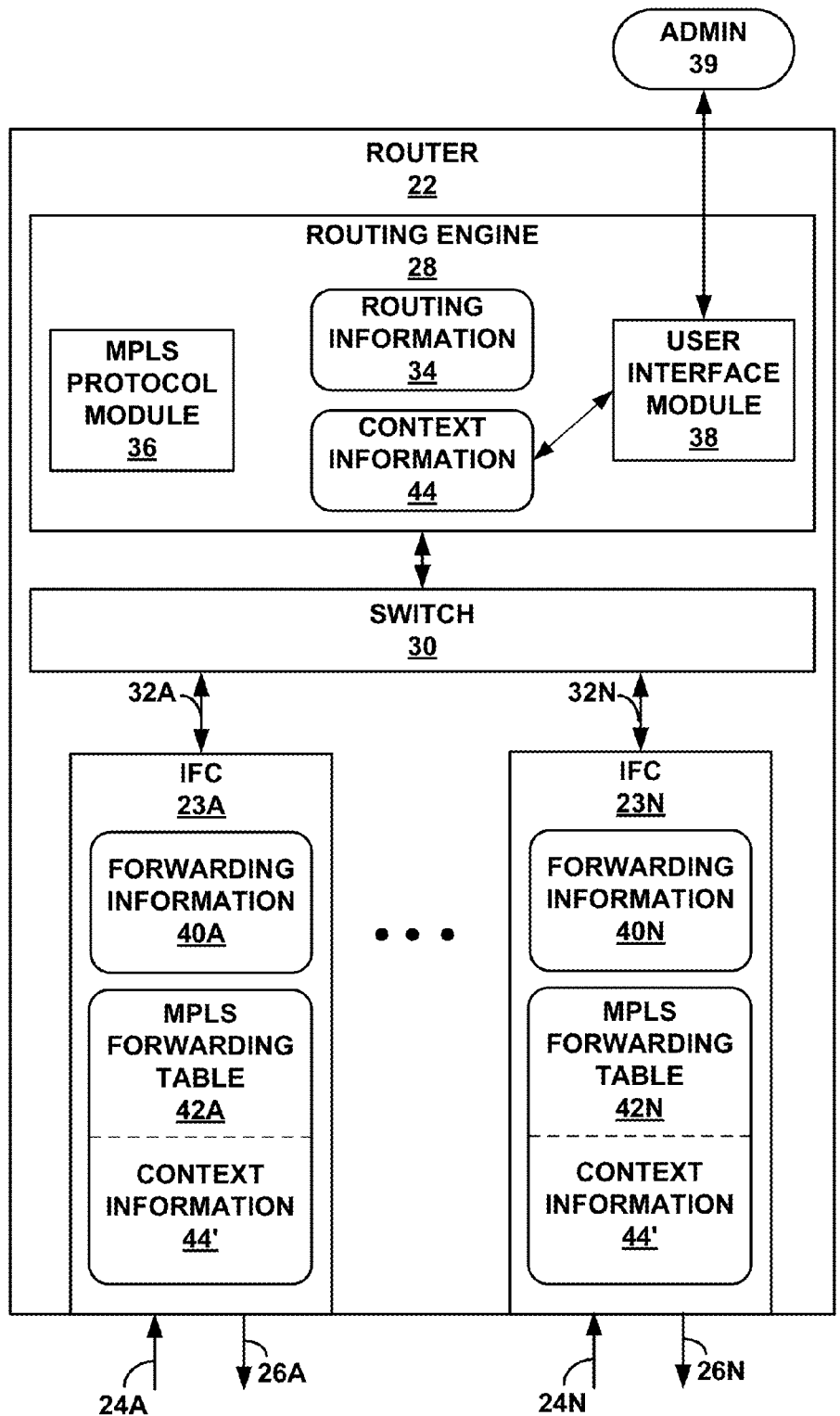
FIG. 2 is a block diagram illustrating an example embodiment of a router that implements the label context transmission techniques described herein.

FIG. 2 is a block diagram illustrating an example embodiment of a router 22 that implements the label context transmission techniques described herein. Router 22 may represent a transit network device similar to network device 12B, however the techniques may be implemented by any network device including both ingress and egress network devices, as well as, any other network device that utilizes labels to forward traffic.

In the exemplary embodiment of FIG. 2, router 22 includes interface cards 23A-23N (collectively, IFCs 23) that receive and send data units, such as packet flows, via network links 24A-24N and 26A-26N, respectively. Router 22 may include a chassis (not shown) having a number of slots for receiving a set of cards, including IFCs 23. Each card may be inserted into a corresponding slot of the chassis for electrically coupling the card to routing engine 28 via high-speed switch 30 and internal data paths 32A-32N (collectively, internal data paths 32).

Switch 30 also provides an interconnect path between each of IFCs 23. Switch 30 may comprise, for example, switch fabric, switchgear, a configurable network switch or hub, or other high-speed switching mechanisms. Internal data paths 32 may comprise any form of communication paths, such as electrical paths within an integrated circuit, external data busses, optical links, network connections, wireless connections, or other communication paths. IFCs 23 may be coupled to network links 24A-24N and 26A-26N via a number of physical interface ports (not shown). Generally, IFCs 23 may each represent one or more network interfaces by which router 22 may interface with links of a network, such as links 20 of network 14.

In general, routing engine 28 operates as a control unit for router 22. Routing engine 28 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Routing engine 28 may further include computer readable storage medium, such as dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include instructions that cause a programmable processor to perform the techniques described herein.

Routing engine 28 may further include an MPLS protocol module 36 and a user interface (UI) module 38. MPLS protocol module 36 represents a hardware and/or software module that implements the above describes signaling and path management protocols, such as the above described LDP, the above described RSVP, or other protocols including the Border Gateway Protocol (BGP). MPLS protocol module 36 may be extended to implement, not only these protocols, but also the label context transmission techniques described herein. For example, MPLS protocol module 36 may be either dynamically or statically configured to establish paths whereby label context information may be inserted into a label stack associated with one or more MPLS packets. User interface module 38 may represent a hardware and/or software module that presents a user interface with which an administrator or other user, such as administrator 39 ("admin 39"), may interact to configure and/or view label context information, as described below in more detail.

Routing engine 28 may further include and maintain routing information 34 that reflects a topology of a network. Router 22 may maintain routing information 34 in the form of one or more tables, databases, link lists, radix trees, databases, flat files, or any other data structure. Based on routing information 34, routing engine 28 generates forwarding information 40A-40N ("forwarding information 40") for IFCs 23.

Each of the IFCs 23 includes a forwarding component (not shown) that forwards packets in accordance with forwarding information 40 and MPLS forwarding tables 42A-42N ("MPLS forwarding tables 42") generated by routing engine 28. Specifically, the forwarding components of IFCs 23 determine a next hop for each inbound packet based on forwarding information 40, identify the corresponding one of IFCs 23 associated with the next hop, and relay the packets to the appropriate one of IFCs 30 via switch 30 and corresponding ones of data paths 32.

IFCs 23 may further include and maintain MPLS forwarding tables 42. MPLS forwarding tables 42 correlate labels associated with incoming MPLS packets with next hops. In accordance with the principles of the invention, MPLS forwarding tables 42 may be extended to include an additional label context information field for defining a type and length or set amount of context information to include when appending (or pushing) and removing (or popping) the corresponding label. That is, each of MPLS forwarding tables 42 may comprise an entry for each label, where each label entry includes one or more fields indicating the current label, an action to take with respect to the label, and a scope or type and a set length or amount of context information associated with the label. This aspect of MPLS forwarding table 42 is illustrated in FIG. 2 as context information 44' to denote that this context information is a derivative of context information 44.

In one embodiment, routing engine 28 may maintain master copies of MPLS forwarding tables 42 and may distribute copies of these tables to each of IFCs 23. Routing engine 28 may add, remove, or modify entries to MPLS forwarding tables 42 and may distribute updated copies to IFCs 23. In another embodiment, routing engine 28 may parse the information in MPLS forwarding tables 42 and send only that forwarding information needed by each of IFCs 23 based on the interfaces associated with each of IFCs 23.

According to the label distribution techniques described in this disclosure, router 22 may resolve paths through a network, such as network 14, to which router 22 belongs. To resolve paths, routing engine 28 of router 22 may employ MPLS protocol module 36 to swap routing information 34 with other peer network devices. In the case of LDP, MPLS protocol module 36 may establish one or more LDP sessions with LDP peers to exchange routing information 34. Routing information 34 may therefore include the label space utilized by routing engine 28 in routing MPLS packets through the network. Routing engine 38 may therefore establish or participate in one or more paths through the network in accordance with the MPLS protocol as implemented by MPLS protocol module 36.

When establishing paths, MPLS protocol module 36 may dynamically negotiate or otherwise specify context information associated with particular labels used in forwarding MPLS packets along a given path to be established. Admin 39 may configure MPLS protocol module 36 with a type and length or set amount of context information to negotiate for each path via interactions with a user interfaces presented by user interface module 38. Alternatively, admin 39 may statically configure a MPLS protocol module, similar to MPLS protocol module 36, of each network device, such as router 22, within a given network to define the type and the length or set amount of context information to transmit with each corresponding label.

While shown as directly interacting with user interface module 38, admin 39 may interact with another intermediate device, such as a provisioning system or device, to facilitate more efficient configuration of network devices. That is, admin 39 may specify either the negotiation parameters to be used in dynamically determining the scope, e.g., the type and length or set amount, of the context information associated with the label or scope of the context information itself (when statically configured). The provisioning system may then interact with each network devices, such as router 22, on behalf of admin 39 to configure these devices according to the input entered by admin 39 to the provisioning system. In this instance, user interface module 38 may present a user interface by which the provisioning system or any other computing device may interact to input configuration information, such as that discussed above. The user interface may, in these instances, accept as input scripts or other files that define a list of commands to quickly input the configuration. The user interface, in these instances, may comprise a Command Line Interface (CLI), for example.

After establishing the path and possibly negotiating the scope of context information to be associated with labels used along the path, routine engine 28 may update routing information 34 to reflect the path and install within one or more of forwarding information 40 and MPLS forwarding tables 42 the bindings or correlations between labels and next hops for the particular path, as well as, define context information 44' within MPLS forwarding tables 42. Routine engine 28 may continue to resolve paths and update IFCs 23 in this manner, and as a result, routing engine 28 may resolve and install a first and second path, or in other words, a plurality of paths within IFCs 23.

IFCs 23 may, meanwhile, receive packets. As router 22 is assumed for purposes of illustration to represent a transit network device, IFCs 23 may generally receive MPLS packets that correspond to a particular one of the plurality of paths resolved by routing engine 28. IFCs 23 may inspect, for each MPLS packet, a top-most or first label included within the label stack defined by the MPLS header of the MPLS packet. IFC 23A may, for example, upon receiving an MPLS packet via link 23A and inspecting the MPLS packet in this above manner, use the determined top-most label as a key into MPLS forwarding table 42A. IFC 23A may retrieve a label entry based on the top-most label and determine a next hop associated with the label, an action to take (e.g., pop, swap, or push), and the scope of the context information, e.g., a type and length or set amount of context information, based on context information 44'.

IFC 23A may then take the action specified by the corresponding label entry. If the action indicates a swap (as is most likely considering that router 22 is assumed to be a transit network device), IFC 23A may replace swap the top-most label with the label indicated by the action and possibly add, remove and/or update the context information associated with the previous label based on context information 44'. That is, the label entry may indicate that the context information associated with the label needs to be swapped with other context information 44' or that a portion of the context information associated with a label need to be replaced or removed. Alternatively, IFC 23A may swap the label leaving any corresponding context information unaltered.

If the action indicates a pop, IFC 23A may remove the top-most label from the label stack and any context information associated with the label. To remove the context information, IFC 23A may remove the corresponding length or set amount of context information following the top-most label. For example, IFC 23A may determine that the set amount of context information equals eight (8) bytes via the corresponding label entry and remove the subsequent 8 bytes immediately following the top-most label on the label stack. If the action indicates a push, IFC 23A may remove the top-most label of the label stack and any context information associated with the label in a manner similar to that of the pop, only the push action adds the set amount of context information defined by label entry below the associated label in the stack.

After taking the above described action, IFC 23A may forward the MPLS packet to the one of IFCs 23 associated with the next hop, as specified by forwarding information 40A. That is, IFC 23A access forwarding information 40A using the next hop as a key to retrieve an entry associated with the next hop. The next hop entry may comprise an IP address assigned to the next network device along the path associated with the top-most label. The next hop entry may identify one of IFCs 23 that couples to the next hop, and IFC 23A may forward the MPLS packet via switch 30 and data paths 32 to the identified one of IFCs 32, which proceeds to forward the MPLS packet via a corresponding one of outbound links 26.

Admin 39 may further interact with a user interface, either the same user interface described above or a different or second user interface, to view context information associated with one or more MPLS packets. In particular, admin 39 may interact with the user interface to cause routing engine 28 to configure IFCs 23 to begin logging context information.

Once configured in this manner, IFCs 23 may, upon accessing a particular label entry, determine a type and length of context information 44' associated with a particular label, as described above. To log this information, IFCs 23 may each access the context information associated with one or more labels in the label stack of each MPLS header as defined by each corresponding label entry in MPLS forwarding table 42A (e.g., as defined by context information 44'). IFCs 23 may copy, parse or otherwise determine this context information according to the corresponding scopes of the context information and forward this context information to routing engine 28. Routine engine 28 may maintain this logged context information as context information 44. Context information 44 may include an entry for each label that identifies a type and scope of the context information as well as the actual context information extracted by IFCs 23.

User interface module 38 may access context information 44 to retrieve one or more entries of context information 44. Admin 39 either directly or via another computing device, such as a provisioning system, may filter context information 39 by providing criteria by which user interface module 38 retrieves entries of context information 44. For example, admin 39 may indicate that the user interface only present context information corresponding to a particular type of context information, such as a source address and destination address. User interface module 38 may then access context information 44 and retrieve only context information 44 that corresponds to the source address and destination address type specified by admin 39. Moreover, admin 39 may indicate a particular source address identified by the context information and user interface 39 may only retrieve that context information 44 that indicates the particular value specified by admin 39.

Further, user interface module 38 may perform other operations to facilitate the ease with which admin 39 views and retrieves the data. In this respect, user interface module 39 may pre-process the retrieved portions of context information 44 to present these portions graphically in a chart, table, graph, or other graphical manner via the user interface. As a result, admin 39 may more quickly view and understand context information 44 and possibly better troubleshoot or debug paths, such as path 18, through a network, such as network 10.

The embodiment of router 22 shown in FIG. 2 is illustrated for exemplary purposes. Alternatively, router 22 may have a centralized control unit having a routing engine and a forwarding engine. In this embodiment, forwarding functionality is not distributed to IFCs 23, but centralized within the forwarding engine. Moreover, the principles of the invention can be realized within a layer 2 or layer 3 (of the OSI model) switch or other device. However, for ease of illustration, the principles of the invention are illustrated in the context of router 22.

Figure 3:
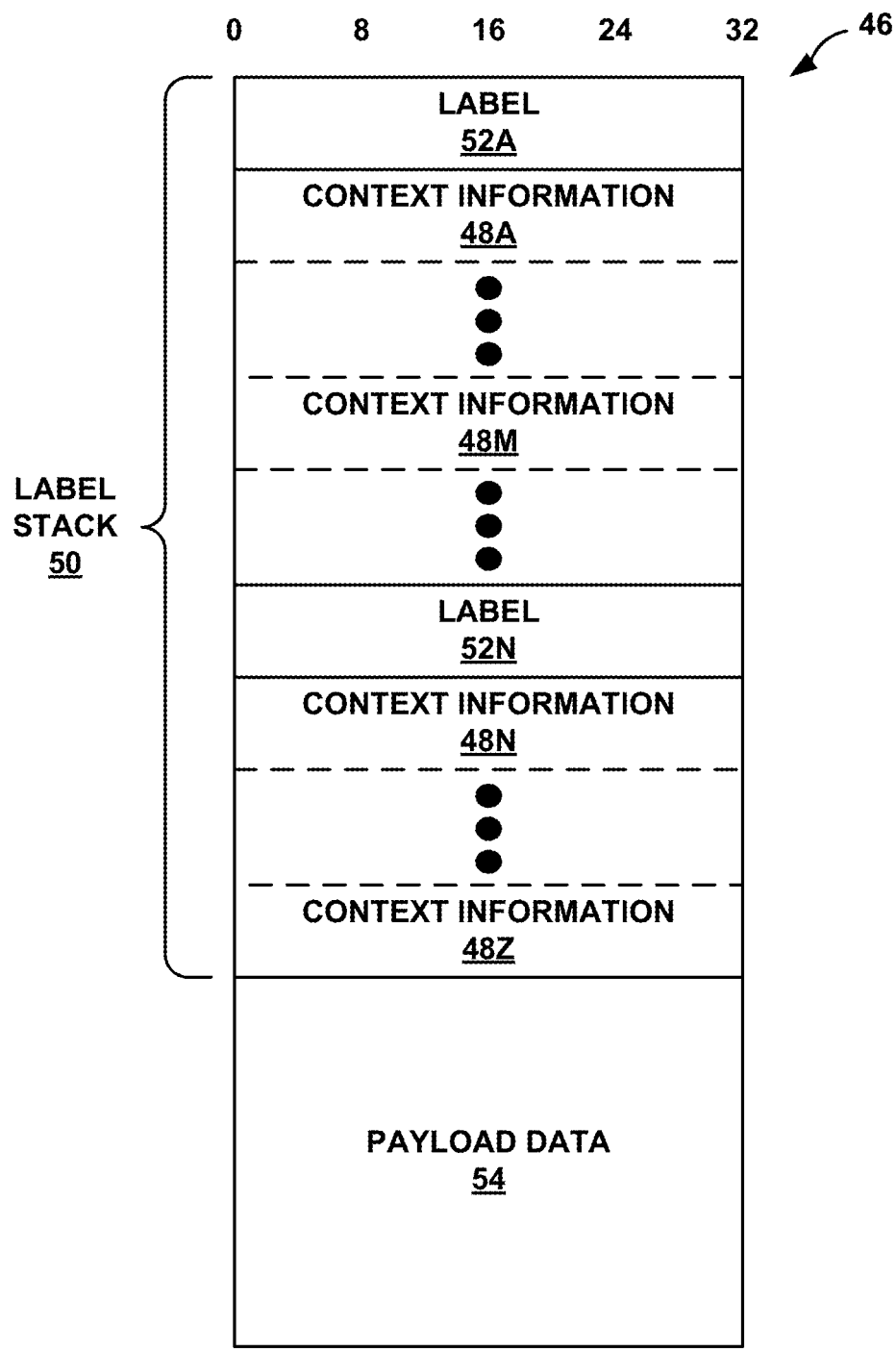
FIG. 3 is a block diagram illustrating an exemplary MPLS packet that includes label context information in accordance with the techniques described in this disclosure.

FIG. 3 is a block diagram illustrating an exemplary MPLS packet 46 that includes label context information 48A-48Z in accordance with the techniques described in this disclosure. MPLS packet 46 may comprise one example of a data unit generated in accordance with the label context transmission techniques described herein.

As shown in FIG. 3, MPLS packet 46 includes a label stack 50 that contains a plurality of labels 52A-52N ("labels 52") and additional context information 48A-48Z ("context information 48"). Each of labels 52 may comprise a 20-bit label value, a 3-bit field identifying a Quality of Service (QoS) priority, a 1-bit bottom of stack flag and an 8-bit Time-To-Live (TTL) field. The 20-bit label value may include a value that identifies the label. The 3-bit QoS field indicates a forwarding priority. The 1-bit bottom of stack field indicates whether each label represents the last or bottom label in label stack 50. In the example of FIG. 3, the 1-bit bottom of stack field for label 52N may be set to "1" to indicate that label 52N is at the bottom of the stack, while all other labels 52A-52M comprise a 1-bit bottom of stack field set to "0" to indicate that these labels 52A-52M are not at the bottom of the stack. The 8-bit TTL field indicates an expiration time for the label.

Typically, each of context information 48 is associated with a given one of labels 52 and includes one or more additional entries in the label stack, where the one or more entries for a given MPLS label is inserted directly below or adjacent to the corresponding one of labels 52 in label stack 50 for a given MPLS packet. In the example illustrated in FIG. 3, MPLS label 52A is associated with a first set of context information 48A-48M, as context information 48A-48M is stored directly below and adjacent to label 52A in label stack 50. Likewise, MPLS label 52N is associated, in the example of FIG. 3, with a second set of context information 48N-48Z, as this second set of context information 48N-48Z is stored directly below and adjacent to label 52N.

In this respect, one or more of a plurality of labels 52 may be associated with a respective set of context information 48. In some instances, each of labels 52 may be associated with a respective set of context information 48, while in other instances, only one or a subset of labels 52 may be associated with a respective set of context information 48. The associations between sets of context information 48 and labels 52 may be, as described above, statically or dynamically configured. Thus, although shown in FIG. 3, as first and second sets of context information 48 associated with respective labels 52A, 52N, the techniques may be implemented in a manner such that any number of labels and sets of context information may be associated to one another.

Each of context information 48 may conform to a distinct information type and length or set amount of context information. Each of these distinct types and lengths are illustrated in FIG. 3 by dashed boxes and denoted a different alphanumerical identifier. Each of context information 48A-48Z, in the example of FIG. 3, comprises a 4 byte or 32 bit (as shown at the top of FIG. 3) amount of context information of one of the above listed types. For example, context information 48A may comprise a 32 bit IP address identifying a source IP address. Context information 48Z, as another example, may comprise a 32 bit customer identifier. Thus, a set of context information 48, such as the set of contest information 48A-48M, may comprise one or more types of set lengths or amounts of context information. Again, these types and lengths, as well as, the type and lengths included within a given set may be dynamically negotiated during path establishment or statically configured prior to path establishment.

LSRs involved in negotiating and establishing an LSP may at any time also exchange and ultimately agree on the context information to subsequently be included in the label stack for MPLS packets traversing the LSP. For example, one or more of the LSRs may include data within the signaling messages of the label distribution protocol, where the data proposes context information to be included. Upon agreement, the ingress LSR includes within the label stack of each packet flowing into the LSP all of the context information proposed during the negotiation of the LSP, thereby making the full, end-to-end context information available at any point along the LSP.

After configuring these sets of context information 48, one or more network devices, such as router 22, may push, swap, and/or pop labels 52 and the corresponding sets of context information 48, as described above. Transit network devices, such as network device 12B of FIG. 1, may perform these push, swap and/or pop actions without inspecting payload data 54 included within MPLS packet 46. Payload data 54 may comprise the original data unit received at an ingress network device, such as network device 12A, from the source network, such as one of customer network 16. Without altering or otherwise editing payload data 54, the ingress network device may inspect payload data 54 and push one of labels 52 onto label stack 50, thereby permitting MPLS packet 46 to traverse a given path associated with the pushed label, such as path 18. Transit network devices may then forward MPLS packet along path 18 without inspecting payload data 54 or supporting the protocol to which payload data 54 corresponds, thereby improving forwarding within the core of the network.

Moreover, transit network devices, such as network device 12B and router 22 that represents a transit LSR, may inspect label stack 50 to parse or otherwise determine context information 48. These transit network devices, which may not be aware of any other network devices other than LSRs and/or LERs and as a result may not be aware of ingress and egress network devices, customers, customer networks and any other devices/networks at the edge of the networks, may then present context information 48 that relates to these edge lying devices, networks, and customers to a user, such as admin 39. In this respect, transit network devices may perform the label context transmission techniques to increase awareness (or transparency) of these edge lying devices, networks, and customers by parsing context information 48 from label stack 50 of MPLS packet 46. Based on this collected context information 48, admin 39 may more efficiently debug and troubleshoot paths through the network.

Figure 4:
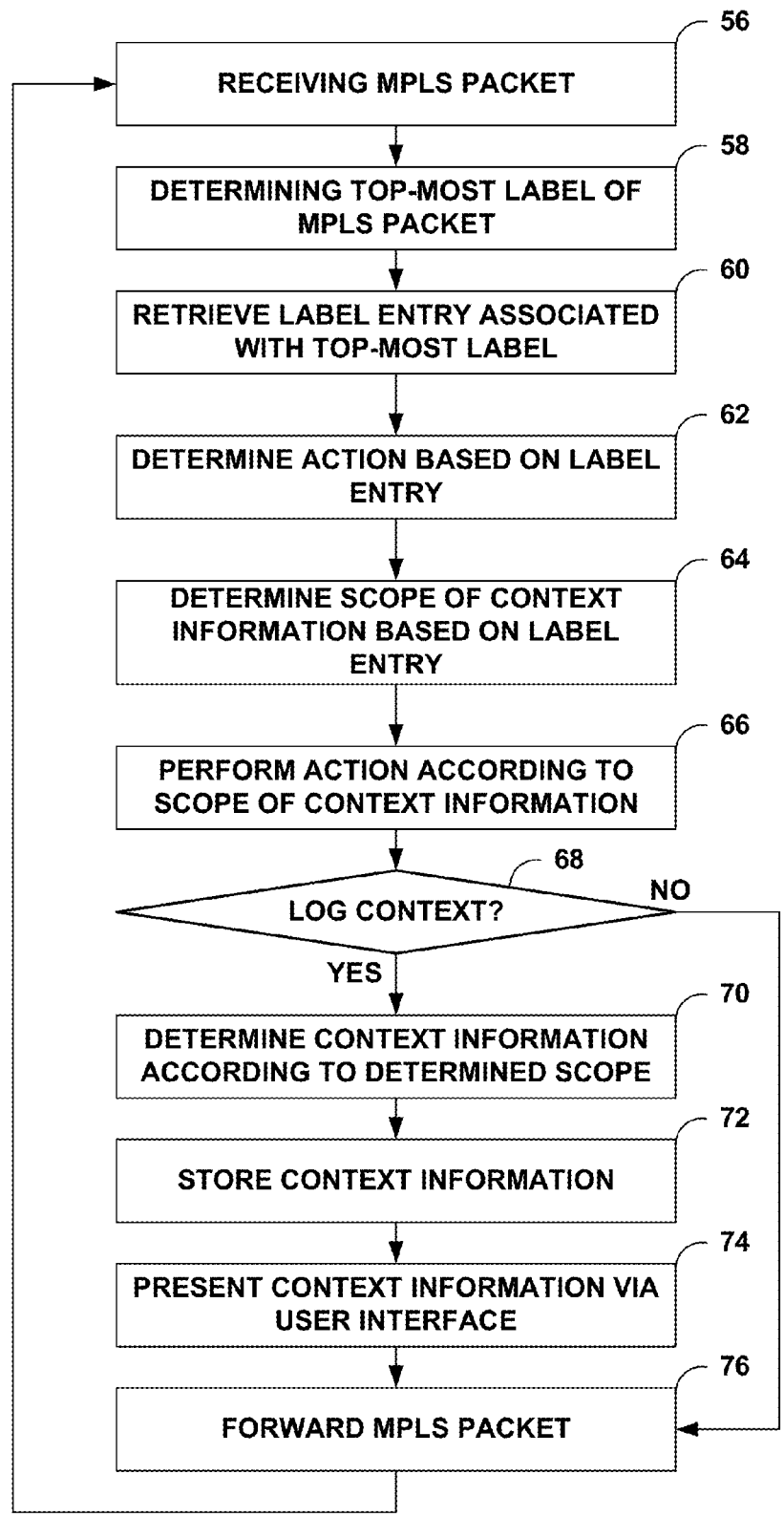
FIG. 4 is a flowchart illustrating exemplary operation of a network device in performing the label context transmission techniques described herein.

FIG. 4 is a flowchart illustrating exemplary operation of a network device, such as router 22 of FIG. 2, in performing the label context transmission techniques described herein. Initially, router 22 may receive an MPLS packet via one of inbound links 24 (54). More specifically, one of IFCs 23 of router 22 may receive the MPLS packet via a corresponding one of links 24. The corresponding one of IFCs 23 may then parse or otherwise determine the top-most label of the label stack defined by the MPLS header of the MPLS packet (58). Referring to MPLS packet 46 of FIG. 3, for example, this one of IFCs 23 may retrieve label 52A of label stack 50 defined by the MPLS header of MPLS packet 46.

Based on this determined top-most label, this one of IFCs 23 may access one of MPLS forwarding tables 42 in the manner described above to retrieve, access or otherwise determine a label entry associated with the top-most label, such as label 52A (60). The label entry may defines both an action to take with respect to the associated top-most label and a scope of any context information associated with the top-most label. The one of IFCs 23 may then determine both the action and the scope of the context information based on the associated label entry (62, 64). The one of IFCs 23 may then perform the determined action (e.g., push, pop or swap of labels) according to the determined scope of the context information (66).

For example, as described above, the receiving one of IFCs 23 may swap the top-most label with a new label, as well as, swap any context information associated with the top-most label with new context information. To swap the top-most label and any associated context, the one of IFCs 23 swap the labels, as labels may be a configured or set amount of bits (e.g., 32 bits or 4 bytes), however context information may vary in length or, in other words, represent a variable amount of information, especially if dynamically configured. Thus, IFCs 23 may require information concerning the length or amount of context information associated with each label. To swap the context information, the one of IFCs 23 may determine, based on the determined scope of the context information, a set amount or length of any context information associated with the top-most label. Based on these set amount, the one of IFCs 23 may swap the amount of context information specified by the scope with new context information of a set length or amount associated with the new label. Likewise, the one of IFCs 23 may push and pop labels according to the scope of the context information.

After taking the appropriate action, the one of IFCs 23 may determine whether to log context information, such as context information 48, associated with any of the labels, such as labels 52, of the label stack, such as label stack 50 (68). As described above, an administrator or other user, such as admin 39, may interact with a user interface presented by user interface module 38 to initiate or otherwise configure the logging of context information. If logging is enabled, the one of IFCs 23 may determine the context information according to the determined scope, much as described above with respect to performing the action (70). In some instances, admin 39 may restrict logging to particular paths or labels or any other criteria, and the one of IFCs 23 may only log relevant context information.

Regardless of the extent to which context information is logged, the one of IFCs 23 may forward the context information to routing engine 28, which may store the context information as context information 44 (72). Context information 44 may comprise a database, tree or other data structure that stores the logged context information such that user interface module 38 may quickly and efficiently retrieve context information 44. User interface module 38 may then access context information 44 to present this context information 44 via a user interface to admin 39 (74). Admin 39 may interact with the user interface to further refine a view of context information 44 or otherwise debug or troubleshoot based on context information 44.

If logging is not enabled or after logging the context information, the one of IFCs 23 may forward the MPLS packet after performing the action (76). The one of IFCs 23 may forward the packet by, as described above, determining the next hop from the associated label entry. The one of IFCs 23 may then use the next hop as a key into a corresponding one of forwarding information 40 to determine which of IFCs 23 couples to the identified next hop via the corresponding one of links 26. The one of IFCs 23 may then forward the MPLS packet to the determined one of IFCs 23, which may forward the MPLS packet via the corresponding one of outbound links 26 to the next hop. In this manner, a network device may transmit label context information in accordance with the techniques to facilitate debugging or troubleshooting within an MPLS or other label-based network.

Figure 5:
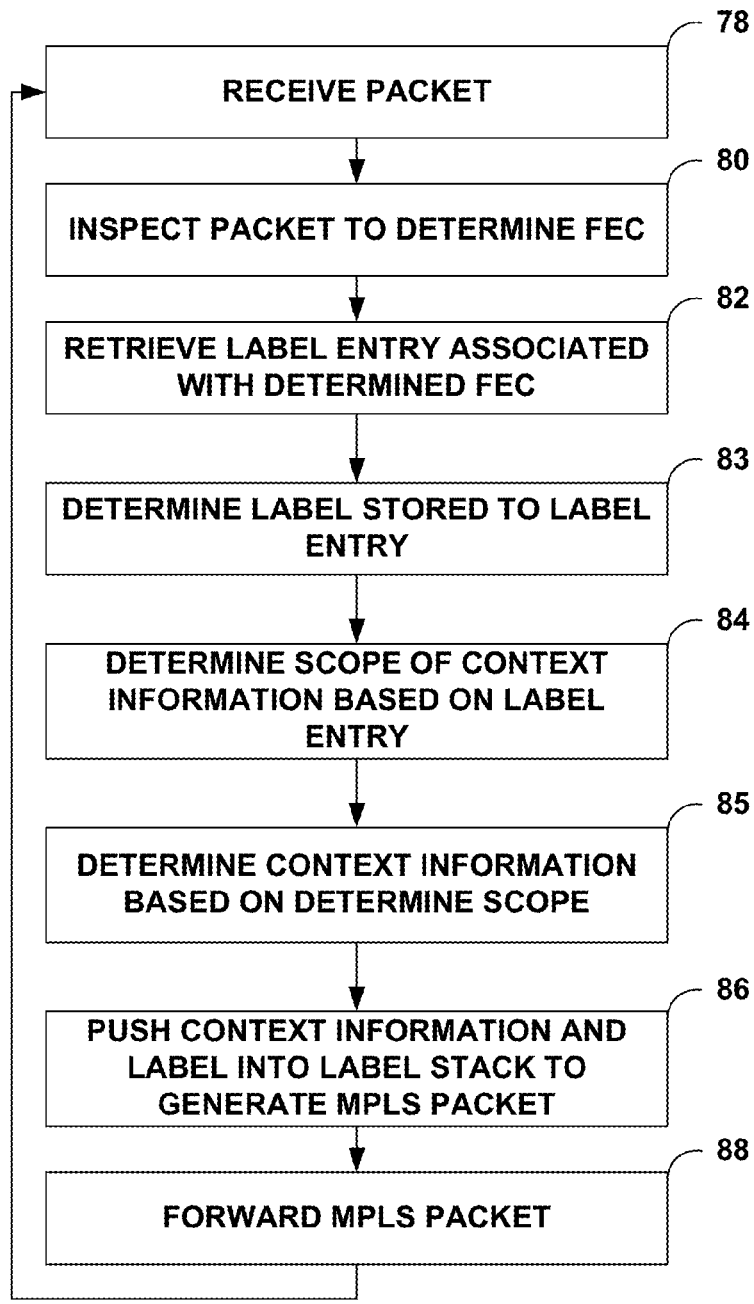
FIG. 5 is a flowchart illustrating exemplary operation of an ingress network device in pushing context information onto a label stack in accordance with the techniques described in this disclosure.

FIG. 5 is a flowchart illustrating exemplary operation of an ingress network device, such as network device 12A of FIG. 1, in pushing context information onto a label stack in accordance with the techniques described in this disclosure. For purposes of illustration, this aspect of the techniques are described with respect to router 22 as shown in FIG. 2. Initially, one of IFCs 23, e.g., IFC 23A, may receive a packet or other data unit from a customer or other network, such as one of customer networks 16 (78). This packet may comprise an IP packet that does not include a label stack.

Upon receiving the packet, IFC 23A may determine to which FEC the packet belongs by inspecting the packet and perform a lookup of a corresponding one MPLS forwarding tables 42 based on the FEC to retrieve a label entry associated with the determined FEC (80, 82). IFC 23A may then determine a label stored in the determined label entry (83). IFC 23A may also determine from the label entry a scope of the context information to store in the label stack, as described above (84). For example, the scope of the context information may indicate that IFC 23A is to store an address assigned to router 22 for a path, such as path 18, and the address assigned to egress network device 22C for path 18. IFC 23A may determine this information when inspecting the packet to determine the FEC to which the packet belongs (85). In these instances where the context information identifies both the ingress and egress devices of a given path, the label associated with this context information may be referred to as a "self-identifying" label in that the label and associated context information identify the path by itself in the data plane without reference to other information normally maintained in the control plane of network devices.

Regardless of type of context information, IFC 23A may push the determined label and the corresponding context information into the label stack of the data unit and forward the data unit with this MPLS header to network device 12B (86, 88). Network device 12B of network 14 may receive the data unit from network device 12A of network 14 via a path 18 established in accordance with LDP, as described above. The received data unit may include one or more labels and context information associated with at least one of the labels that defines the context for the at least one of the labels. In this manner, a network device may push both a label and associated context information so that interior LSRs, such as network device 12B, may extract and thereby determine a context in which to troubleshoot or otherwise interpret the encapsulated data unit.

In general, the processes described above, including transmission of label contexts within packets as described herein, may be implemented as executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. Moreover, the functions of the processes may be implemented by executing the instructions of the computer-readable medium with one or more processors, discrete hardware circuitry, firmware, software executing on a programmable processor, or a combination of any of the above. Various embodiments of the invention have been described. These and other embodiments are within the scope of the following claims.

The invention claimed is:

1. A method comprising:
    receiving, with a first network device intermediately positioned along a label-switched path (LSP) through a network between an ingress to the LSP and an egress to the LSP, a Multi-Protocol Label Switching (MPLS) data unit from a second network device of the network in accordance with a label switching protocol, wherein the data unit includes a label stack affixed to a payload, wherein the label stack includes two or more MPLS labels used for forwarding the data unit through the network and context information associated with at least two of the MPLS labels of the label stack, wherein the context information is arranged in the label stack to alternate between entries containing individual ones of the two or more MPLS labels and entries containing portions of the context information that pertains to the preceding one of the MPLS labels in the label stack and provides a context unused to forward the MPLS data unit and for understanding the associated at least two MPLS labels of the label stack, and wherein the context information identifies a packet flow transported by the data unit by specifying a source address, a source port, a destination address, a destination port and a protocol associated with the payload contained within the data unit;
    forwarding the data unit out an output interface of the first network device in accordance with the two or more MPLS labels of the label stack;
    when forwarding the data unit, parsing, with the first network device, the data unit to determine the context information; and
    recording, with the first network device, the forwarding of the data unit and the determined context information.

2. The method of claim 1, further comprising presenting a report to a user with the first network device, wherein the report provides an indication of the forwarded data unit and the determined context information.

3. The method of claim 1, wherein forwarding the data unit comprises:
    swapping one of the labels with a new label identified in a forwarding table of a network device without modifying the context information of the label stack to associate the new label with any context information within the label stack associated with the swapped one of the labels; and
    forwarding the data unit according to the new label.

4. The method of claim 1, wherein forwarding the data unit comprises:
    after receiving the data unit, removing one of the labels from the label stack;
    removing from the label stack any of the context information associated with the one of the labels removed from the label stack; and
    forwarding the data unit according to a next one of the one or more labels within the label stack or, when all of the labels have been removed, a destination specified by the payload of the data unit.

5. The method of claim 1, further comprising prior to receiving the data unit, receiving a signaling message with the first network device in accordance with the label switching protocol to negotiate establishment of the label switched path, wherein the signaling message specifies the context information to be included within the network stack for at least one of the one or more labels.

6. The method of claim 5, wherein the signaling message specifies a data type for the context information to be included within the label stack.

7. The method of claim 6, wherein the data type specifies that the context information is to include the source address, the destination address, the source port, the destination port, and the protocol.

8. The method of claim 1, further comprising receiving configuration information from the user associating a set amount of context information with the at least one of the labels for which the context information defines the context and defines a type of the context information, wherein the types of context information include the source address, the destination address, the source port, the destination port and the protocol.

9. The method of claim 8,
    wherein parsing the context information comprises parsing the set amount of context information from the data unit, and
    the method further comprises presenting the set amount of context information alongside the type of the context information to a user to facilitate debugging of the network.

10. The method of claim 1,
    wherein the network comprises a Multi-Protocol Label Switching (MPLS) network,
    wherein the first network device comprises a Label Switching Router (LSR),
    wherein the second network device comprises one of an LSR or a Label Edge Router (LER), and
    wherein the label switching protocol comprises a Label Distribution Protocol (LDP).

11. A network device intermediately positioned along a label-switched path (LSP) through a network between an ingress to the LSP and an egress to the LSP comprising:
    an interface card that receives a Multi-Protocol Label Switching (MPLS) data unit from a second network device of the network in accordance with a label switching protocol, wherein the data unit includes a label stack affixed to a payload, and wherein the label stack includes two or more MPLS labels used for forwarding the data unit through the network and context information associated with at least one of the labels of the label stack, wherein the context information is arranged in the label stack to alternate between entries containing individual ones of the two or more MPLS labels and entries containing portions of the context information that pertains to the preceding one of the labels in the label stack and provides a context unused to forward the MPLS data unit and for understanding the associated at least two of the MPLS labels of the label stack, and wherein the context information identifies a packet flow transported by the data unit by specifying a source address, a source port, a destination address, a destination port and a protocol associated with the payload contained within the data unit, forwards the data unit in accordance with the two or more MPLS labels of the label stack and, when forwarding the data unit, parses the data unit to determine the context information; and a control unit that records the forwarding of the data unit and the determined context information.

12. The network device of claim 11, wherein the control unit further presents a report to a user, wherein the report provides an indication of the forwarded data unit and the determined context information.

13. The network device of claim 11, wherein the interface card maintains a forwarding table, swaps one of the labels with a new label identified in the forwarding table without modifying the context information of the label stack to associate the context information with the new label, and forwards the data unit according to the new label, and forwards the data unit according to the new label.

14. The network device of claim 11, wherein the interface card, after receiving the data unit, removes one of the labels from the label stack, removes from the label stack any of the context information associated with the one of the labels removed from the label stack and forwards the data unit according to a next one of the one or more labels within the label stack or, when all of the labels have been removed, a destination specified by the payload of the data unit.

15. The network device of claim 11, wherein the control unit includes an MPLS protocol module that, prior to receiving the data unit, receives a signaling message in accordance with the label switching protocol to negotiate establishment of the label switched path, wherein the signaling message specifies the context information to be included within the network stack for at least one of the one or more labels.

16. The network device of claim 15, wherein the signaling message specifies a data type for the context information to be included within the label stack.

17. The network device of claim 16, wherein the data type specifies that the context information is to include the source address, the destination address, the source port, the destination port, and the protocol.

18. The network device of claim 11, wherein the interface card further receives an Label Distribution Protocol (LDP) message in accordance with a LDP that defines a scope for the context information associated with the at least one of the labels for which the context information defines the context, wherein the scope defines a type and set amount of context information associated with the at least one of the labels, wherein the types of context information include the source address, the destination address, the source port, the destination port and the protocol.

19. The network device of claim 11, wherein the control unit includes a user interface module that presents a user interface by which a user may enter configuration information associating a scope for the context information with the at least one of the labels for which the context information defines the context, wherein the scope defines a type and set amount of the context information, and wherein the types of context information include at least one of a source address, a destination address, an ingress address, an egress address, a customer identifier, a virtual private large area network address, a source port, a destination port, an ingress port, and an egress port.

20. The network device of claim 19,
wherein the interface card parses the set amount of context information from the data unit, and
wherein the control unit includes a user interface module that presents the set amount of context information alongside the type of the context information to a user via a user interface to facilitate debugging of the network.

21. The network device of claim 11,
wherein the network comprises a Multi-Protocol Label Switching (MPLS) network,
wherein the first network device comprises a Label Switching Router (LSR),
wherein the second network device comprises one of an LSR or a Label Edge Router (LER), and
wherein the label switching protocol comprises a Label Distribution Protocol (LDP).

22. A network system comprising:
one or more customer networks; and
a network comprising:
at least two network devices that each reside at an edge of the network, wherein one of the at least two edge network devices couples to the one or more customer networks; and
a transit network device positioned between the at least two edge network devices, wherein the transit network device includes:
an interface card that receives a data unit from one of the edge network devices of the network in accordance with a label switching protocol, wherein the data unit includes one or more labels used for forwarding the data unit through the network and context information associated with at least one of the labels, wherein the context information is arranged in the label stack to alternate between entries containing individual ones of the two or more labels and entries containing portions of the context information that pertains to the preceding one of the labels in the label stack and provides a context unused to forward the MPLS data unit and for understanding the associated at least two of the labels of the label stack, and wherein the context information identifies a packet flow transported by the data unit by specifying a source address, a source port, a destination address, a destination port and a protocol associated with the payload contained within the data unit, and
wherein the interface card further parses the data unit to determine the context information; and
a control unit that presents the determined context information to a user.

23. The network system of claim 22,
wherein the interface card receives the data unit via a Label Switching Path (LSP) established in accordance with a Label Distribution Protocol (LDP) between the at least two edge network devices.

24. A network system comprising:
an ingress Label Switching Router (LSR) of a Multi-Protocol Label Switching (MPLS) network;
an egress LSR of the MPLS network; and
at least one intermediate LSR positioned between the ingress LSR and egress LSR of the MPLS network,
wherein the ingress LSR, the egress LSR and the at least one intermediate LSR all lie along a Label Switched Path (LSP) through the MPLS network,
wherein the ingress LSR, the egress LSR and the at least one intermediate LSR exchange one or more signaling messages in accordance with a label distribution protocol (LDP) to negotiate establishment of the LSP, and wherein the one or more signaling messages each specifies context information unused to forward the MPLS data unit and to be included within a network stack for at least one of one or more labels when forwarding the MPLS packets along the LSP, and wherein the context information identifies a packet flow transported by the data unit by specifying a source address, a source port, a destination address, a destination port and a protocol associated with the payload contained within the data unit.

25. A non-transitory computer-readable medium comprising instructions for causing a programmable processor of a first network device to:
    receive, along a label-switched path (LSP) through a network, a Multi-Protocol Label Switching (MPLS) data unit from a second network device of the network in accordance with a label switching protocol, wherein the data unit includes a label stack affixed to a payload, wherein the label stack includes two or more MPLS labels used for forwarding the data unit through the network and context information associated with at least one of the labels of the label stack, wherein the context information is arranged in the label stack to alternate between entries containing individual ones of the two or more MPLS labels and entries containing portions of the context information that pertains to the preceding one of the MPLS labels in the label stack and provides a context unused to forward the MPLS data unit and for understanding the associated at least two of the MPLS labels of the label stack, and wherein the context information identifies a packet flow transported by the data unit by specifying a source address, a source port, a destination address, a destination port and a protocol associated with the payload contained within the data unit, and wherein the first network device comprises a transit network device intermediately positioned between an ingress to the LSP and an egress to the LSP;
    forward the data unit in accordance with the two or more MPLS labels of the label stack;
    when forwarding the data unit, parse the data unit to determine the context information; and
    record the forwarding of the data unit and the determined context information.

26. The non-transitory computer-readable medium of claim 25, wherein the instructions further cause the programmable processor to present a report to a user, wherein the report provides an indication of the forwarded data unit and the determined context information.

27. The non-transitory computer-readable medium of claim 25, wherein the instructions further cause the programmable processor to, prior to receiving the data unit, receive a signaling message with the network device in accordance with the label switching protocol to negotiate establishment of the label switched path, wherein the signaling message specifies the context information to be included within the network stack for at least one of the one or more labels.

28. A method comprising:
    receiving, with a first ingress network device along a label-switched path (LSP) through a first network, a data unit from a second network device of a second network, wherein the data unit includes a header and a payload, but does not include a label stack;
    inspecting, with the first ingress network device, the header and payload of the data unit to determine a forwarding equivalence class (FEC);
    determining, with the first ingress network device, a label entry within a forwarding table based on the determined FEC, wherein the label entry defines a MultiProtocol Label Switching (MPLS) label and a scope of context information associated with the MPLS label to affix to the data unit, wherein the context information provides a context unused to forward the MPLS data unit, and wherein the context information identifies a packet flow transported by the data unit by specifying a source address, a source port, a destination address, a destination port and a protocol specified in the header of the data unit;
    determining, with the first ingress network device, context information in accordance with the scope of the context information defined by the label entry;
    affixing, with a first ingress network device, a label stack to the data unit in accordance with an MPLS protocol to generate an MPLS packet, wherein the label stack includes the MPLS label defined by the label entry and the determined context information; and
    forwarding, with the first ingress network device, the MPLS packet out an output interface of the first ingress network device in accordance with the MPLS label of the label stack to a transit network device intermediately positioned between the first ingress network device to the LSP and an egress network device of the LSP so as to enable the transit network device to record the context information included in the label stack.

* * * * *